Jan. 15, 1952     H. W. SANFORD ET AL     2,582,887
COOKING STOVE
Original Filed March 17, 1942     2 SHEETS—SHEET 1
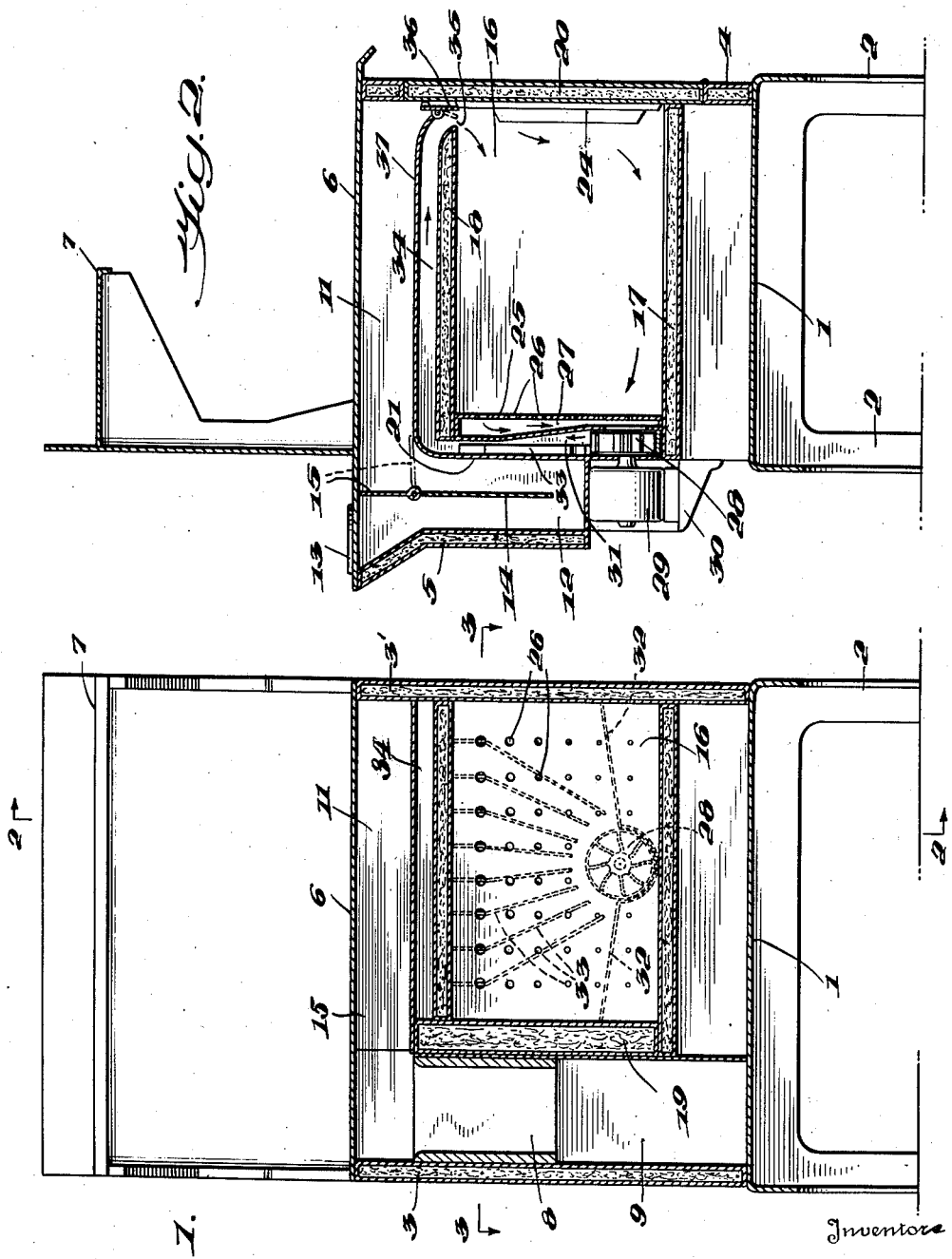

Jan. 15, 1952     H. W. SANFORD ET AL     2,582,887
COOKING STOVE
Original Filed March 17, 1942     2 SHEETS—SHEET 2
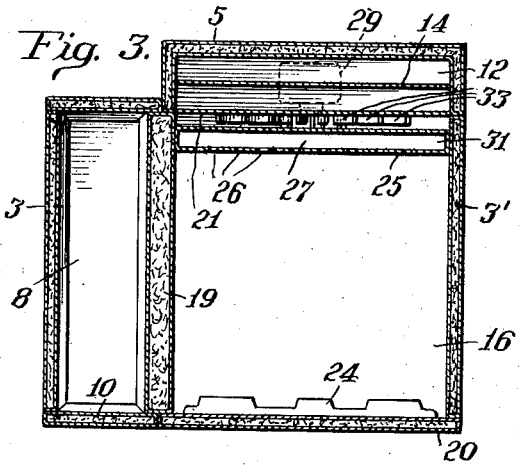
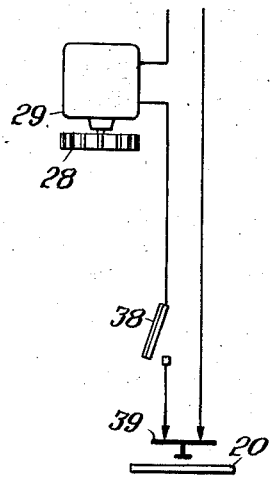
Inventors
Hugh W. Sanford
William P. Biddle Jr.
By Cyrus Kehr & Sweeker
Attorneys Patented Jan. 15, 1952

2,582,887

UNITED STATES PATENT OFFICE 2,582,887

COOKING STOVE

Hugh W. Sanford and William P. Biddle, Jr., Knoxville, Tenn.; said Biddle, Jr., assignor to said Sanford Original application March 17, 1942, Serial No. 435,088. Divided and this application February 14, 1947, Serial No. 728,410

8 Claims. (Cl. 126—1)

This application is a division of our prior application, Serial No. 435,088, filed March 17, 1942, now Patent No. 2,417,842, granted March 25, 1947.

This invention relates to improvements in cooking stoves, particularly of the character having ovens for the baking of food products.

It has been customary heretofore in cooking stoves to circulate the flue gas constituting the heating media substantially around the several sides of the oven transversely thereof, passing from the fire box over the top and down the opposite side of the oven to an outlet flue at the bottom, depending upon radiation of the heat into the oven for the heating thereof. This is objectionable because it produces non-uniform heating within the oven, and the bottom portions of the flues frequently get clogged up, which reduces the efficiency of the stove very materially.

An object of the invention is to increase the efficiency of the cooking stove by producing more uniform heat throughout the oven, while permitting initial heating of the oven to higher temperature in much shorter time than has been possible heretofore.

A further object of the invention is to reduce the cost of the stove by simplifying the construction thereof, while obtaining efficient heat radiation from the heating means for heating the oven without waste.

These objects are accomplished by recirculating the air out of and into the oven and through the same, thus obtaining uniform heat distribution throughout the oven, and heating the air thus withdrawn from the oven at a point externally thereof in a manner that is efficient and which tends to simplify and materially improve the construction.

The manner in which the air is recirculated makes possible the elimination of the conventional passage of the hot gas from the heating means around the side and below the oven, after passing over the top of the oven from the heating means to an outlet located beneath the oven. By recirculating the air in the oven, it is possible to heat this air efficiently for quick uniform heating of the oven, by applying the heating action principally to the circulating air along two surfaces, as one side and the top of the oven, thus obtaining adequate and efficient heat transfer while dispensing with the ducts that are customarily used for circulating the heating media downward on the opposite side of the oven and beneath the same.

This simplified the construction materially and reduces the cost of the stove. It makes possible also the efficient insulation of the outside walls and doors of the stove so that heat will not be lost by radiation in the kitchen, and when desired, the top likewise may be completely insulated to confine the heat substantially to the oven.

It is preferable in this invention to obtain recirculation of the air from and into the oven by power means, such as a fan, the speed of which may be regulated thermostatically to vary or control the temperature of the oven, and it may be stopped automatically upon the opening of the door. A combined fan and blower serves not only for recirculating the air for heating, but also to distribute the heat uniformly throughout the oven thus obtaining uniform baking conditions therein.

The invention may be embodied in different forms utilizing the characteristics thereof, one of which is shown in the accompanying drawings, in which:

Fig. 1 is a vertical sectional view through a cooking stove embodying one form of the invention;

Fig. 2 is a cross section thereof on the line 2—2 of Fig. 1;

Fig. 3 is a horizontal section therethrough on the line 3—3 of Fig. 1; and

Fig. 4 is a diagrammatic view of the fan controls.

Referring to the form shown in Figs. 1, 2 and 3, the stove is shown as constructed of a base 1, supported on legs 2. Upstanding from the base 1 are insulated opposite side walls 3 and 3', a front wall 4, and a back wall 5, which walls support a cooking top 6 thereon. A high shelf is shown at 7 and may be used where desired.

On one side of the stove is located a fire box 8, adapted to have the usual grate therein with an ash pit 9 therebeneath, these being of conventional construction except that they extend throughout a substantial portion of the height of the stove. An ash pit door 10 may be provided in the front wall 4, for gaining access thereto in the usual way.

As shown in Fig. 1, a top flue 11 extends laterally from the top of the fire box 8 beneath the cooking top 6. The flue 11 is closed at the front of the stove, but the rear thereof is in open communication with a smoke back 12, inwardly of the insulated back wall 5, as shown in Fig. 2, for discharge of the products of combustion through a smoke outlet 13. A partition 14 extends vertically in the smoke back 12 to divide the same for downward circulation of the heating media therethrough. The upper end of the partition 14 has a damper 15 pivotally mounted so as to swing to the dotted line position, shown in Fig. 2, when it is desired to circulate the heating media directly to the discharge outlet 13 from beneath the cooking top.

The oven is designated generally by the numeral 16 formed between insulated bottom 17 and top 18 and between the insulated oven side 19 and the stove side wall 3'. The front of the oven is closed by a hinged door 20, having deflectors 24 on the inner face thereof.

The back of the oven is closed by a back wall 25, having perforations 26, disposed throughout the major portion thereof as shown in Fig. 1, and preferably, of gradually decreasing size from the top to the bottom of said wall. On the opposite side of the back wall 25 is an air chamber 27, having an opening at the lower center portion thereof to the intake side of a fan 28. The fan 28 is shown as operated by an electric motor 29, supported on a bracket 30 at the back of the stove.

The discharge side of the fan 28 is in open communication with an air chamber 31, closed at the bottom by inclined plates 32 that extend outwardly on opposite sides of the fan 28, as shown in Fig. 1. The air chamber 31 is in heat exchange relation with the smoke back 12, the inner wall 21 of which smoke back forms one wall of the chamber 31. The wall 21 is provided with upwardly inclined fins 33, radiating from the fan 28, as shown in Fig. 1 for uniformly distributing the air in heat exchange relation with the smoke back wall 21 and for efficient heat radiation of the air.

The upper end of the air chamber 31 is in open communication with an air duct 34 which extends therefrom to the forward side of the stove where the air is discharged through an opening 35 into the top front portion of the oven 16. A damper 36 is pivotally mounted in the opening 35 immediately behind the door 20 with a portion thereof projecting into the path of the door when closed, normally to turn the damper to the full line position, but free to swing to the dotted line position thereof in Fig. 2, when the oven door is opened, to direct the stream of air toward the rear of the oven and thus prevent an excess loss of the heated air into the room through the opened door.

It will be evident that when the fan 28 is operated, it will draw air from the oven through the perforations 26 in the back wall 25, and discharge this air upwardly through the air chamber 31 which directs the air upwardly at the back of the oven, into and through the air duct 34 and then across the top of the oven to the front thereof where it is discharged through the opening 35 in a downward direction. The air in its passage through the chamber 31 and air duct 34 is heated by contact with the wall 21 and also with the wall 37 forming the bottom of the top flue 11, thus obtaining efficient radiation of heat, and effecting uniformity of oven temperature due to the recirculation of the oven air in contact with heating surface. When the heated air is discharged into the oven, part of it is deflected toward the rear of the oven by means of the deflectors 24 on the door thereof.

By thus recirculating the air through the oven and to the heating means, it is not necessary for the flue to extend entirely around the oven, as has been the practice heretofore. This reduces the cost of construction by reason of dispensing with the ducts at the right of, and beneath, the oven.

As shown in Fig. 4, the motor 29 for operating the fan 28 may be controlled thermostatically, if desired, by a switch 38 within the oven 16, and a switch 39 controlled by the door 20 may be used also to close the circuit to the motor only when the oven door is closed. These switches are shown as connected in the power circuit for the motor, either or both of which switches may be used with the invention, if desired.

We claim:

1. In a cook stove, the combination of a cooking top, an oven disposed beneath the cooking top spaced therefrom, a fire box disposed beside the oven beneath the cooking top, said stove having a flue in open communication with the fire box and extending only over the top and rear of the oven, said flue having an outlet directly therefrom adjacent the top of the oven, an upright partition dividing the portion of the flue over the rear of the oven, a damper located in the upper portion of said partition for diverting the flue gases around the back of the oven, said fire box and flue forming heating means for the stove, the oven having outlet and inlet openings at different sides thereof, conduits connected respectively with the openings and located externally of the oven, said conduits being in open communication with each other for recirculation of air from the outlet to the inlet of the oven, said oven having a front door for access thereto, said inlet opening being adjacent said door, and means for deflecting the air from said inlet opening toward the back of the oven.

2. In a cook stove, the combination of a cooking top, an oven disposed beneath the cooking top spaced therefrom, a fire box disposed beside the oven beneath the cooking top, said stove having a top flue in open communication with the fire box and extending over the top of the oven, said flue having an outlet directly therefrom adjacent the top of the oven, said fire box and flue forming heating means for the stove, the oven having outlet and inlet openings at different sides thereof, conduits adjacent the top and back of the oven connected respectively with the openings and located externally of the oven, said conduits being in open communication with each other for recirculation of air from the outlet to the inlet of the oven, insulating means located between the oven and the conduit adjacent the top thereof, said oven having a front door for access thereto, said inlet opening being adjacent said door, and means for deflecting the air from said inlet opening toward the back of the oven automatically when the door is open.

3. In a cooking stove, the combination of a cooking top, an oven disposed beneath the cooking top and spaced therefrom, a fire box disposed beside the oven, a top flue having an outlet and being in open communication with the fire box, said flue extending only transversely of the oven and at a level above the top of the oven, whereby the hot gases in said flue reach the flue outlet without having passed beneath the bottom of the oven, said oven having an intake port and an oppositely disposed discharge port, power means for circulating air repeatedly through the oven and through the intake and discharge ports, whereby the said air passes over the top of the oven underneath the bottom wall of the said top flue and above the top wall of the oven, and insulation in the top wall of the oven, whereby the radiant heat from the flue gases which reaches the air passing over the top of the oven will not be radiated appreciably into the oven and the circulating air heats articles cooking in the oven primarily by convection rather than by radiation.

4. In a cooking stove, the combination of a cooking top, an oven disposed beneath the cooking top and spaced therefrom, a fire box disposed beside the oven, a top flue having an outlet and being in open communication with the fire box, said flue extending only transversely of the oven and at a level above the top of the oven, whereby the hot gases in said flue reach the flue outlet without having passed beneath the bottom of the oven, said oven having an intake port and an oppositely disposed discharge port, power means for circulating air repeatedly through the oven and through the intake and discharge ports, whereby said air passes over the top of the oven underneath the bottom wall of said top flue and above the top wall of the oven, a door closing the oven, insulation carried by said door, and insulation in the top wall of the oven, whereby the radiant heat from the flue gases which reaches the air passing over the top of the oven will not be radiated appreciably into the oven and the circulating air heats articles cooking in the oven primarily by convection rather than by radiation.

5. In a cooking stove, the combination of a cooking top, an oven disposed beneath the cooking top and spaced therefrom, a fire box disposed beside the oven, a top flue having an outlet and being in open communication with the fire box, said flue extending only transversely of the oven and at a level above the top of the oven, whereby the hot gases in the said flue reach the flue outlet without having passed beneath the bottom of the oven, said oven having an intake port and an oppositely disposed discharge port, power means for circulating air repeatedly through the oven and through the intake and discharge ports, whereby said air passes over the top of the oven underneath the bottom wall of said top flue and above the top wall of the oven, a door closing the oven, insulation carried by said door, a main bottom in the oven, insulation carried by said bottom, and insulation in the top wall of the oven, whereby the radiant heat from the flue gases which reaches the air passing over the top of the oven will not be importantly radiated into the oven and the circulating air heats articles cooking in the oven primarily by convection rather than by radiation.

6. In a cooking stove, the combination of a cooking top, an oven disposed beneath the cooking top and spaced therefrom, a fire box disposed beside the oven, a top flue having an outlet and being in open communication with the fire box, said flue extending only transversely of the oven and at a level above the top of the oven, whereby the hot gases in the said flue reach the flue outlet without having passed beneath the bottom of the oven, said oven having an intake port and an oppositely disposed discharge port, power means for circulating air repeatedly through the oven and through the intake and discharge ports, whereby said air passes over the top of the oven underneath the bottom wall of said top flue and above the top wall of the oven, a door closing the oven, insulation carried by said door, a main bottom in the oven, insulation carried by said bottom, one of the side walls of the oven being the main outside wall of the stove, insulation carried by said wall, and insulation in the top wall of the oven, whereby the radiant heat from the flue gases which reaches the air passing over the top of the oven will not be radiated appreciably into the oven and the circulating air heats articles cooking in the oven primarly by convection rather than by radiation.

7. In a cooking stove, the combination of a cooking top, an oven disposed beneath the cooking top and spaced therefrom, a fire box disposed beside the oven, a top flue having an outlet and being in open communication with the fire box, said flue extending only transversely of the oven and at a level above the top of the oven, whereby the hot gases in the said flue reach the flue outlet without having passed beneath the bottom of the oven, said oven having an intake port and an oppositely disposed discharge port, power means for circulating air repeatedly through the oven and through the intake and discharge ports, whereby said air passes over the top of the oven underneath the bottom wall of said top flue and above the top wall of the oven, a door closing the oven, insulation carried by said door, a main bottom in the open, insulation carried by said bottom, one of the side walls of the oven being the main outside wall of the stove, insulation carried by said wall, a side wall adjacent the fire box, insulation carried by said side wall adapted to prevent an appreciable amount of radiant heat from the fire box reaching the oven through said wall, and insulation in the top wall of the oven, whereby the radiant heat from the flue gases which reaches the air passing over the top of the oven will not be radiated appreciably into the oven and the circulating air heats articles cooking in the oven primarily by convection rather than by radiation.

8. In a cook stove, the combination of an oven, heating means including a duct extending only adjacent the top and rear side of the oven, a conduit extending over the top of the oven and lying between the oven and the portion of the duct adjacent the top of the oven, heat insulating means disposed between said conduit and the interior of the oven, a second conduit in direct communication with the first mentioned conduit and lying between the portion of the duct adjacent the rear side of the oven, said second conduit being in open communication with the inside of the oven, a baffle centrally disposed in said second conduit and provided with an opening in the bottom thereof, and blower means located in the bottom portion of said second duct associated with the opening therein adapted to circulate air through said conduit and said oven.

HUGH W. SANFORD.
WILLIAM P. BIDDLE, Jr.

REFERENCES CITED

The following references are of record in the file of this patent:

UNITED STATES PATENTS

| Number | Name | Date |
|---|---|---|
| 651,786 | Turner | June 12, 1900 |
| 655,761 | Culver | Aug. 14, 1900 |
| 693,343 | Anthony | Feb. 11, 1902 |
| 1,176,093 | Phillips | Mar. 21, 1916 |
| 1,218,341 | Truitt | Mar. 6, 1917 |
| 1,893,694 | Bohmker | Jan. 10, 1933 |
| 1,950,212 | Barnett et al. | Mar. 6, 1934 |
| 2,017,728 | Oskamp | Oct. 15, 1935 |
| 2,180,068 | Scott | Nov. 14, 1939 |
| 2,214,630 | Wheeler | Sept. 10, 1940 |
| 2,279,804 | Walz | Apr. 14, 1942 |
| 2,330,495 | Karges | Sept. 28, 1943 |
| 2,350,293 | Stanchfield | May 30, 1944 |
| 2,417,842 | Sanford et al. | Mar. 24, 1947 |

FOREIGN PATENTS

| Number | Country | Date |
|---|---|---|
| 332,874 | Great Britain | June 31, 1930 |
| 97,818 | Sweden | Jan. 16, 1940 |